United States Patent [19]

Sugita et al.

[11] 4,117,634
[45] Oct. 3, 1978

[54] CONTROLLING METHOD FOR A GRINDING MACHINE

[75] Inventors: Terumitsu Sugita; Yasuo Tateishi, both of Narashino, Japan

[73] Assignee: Seiko Seiki Kabushiki Kaisha, Japan

[21] Appl. No.: 764,074

[22] Filed: Jan. 31, 1977

[51] Int. Cl.² .............................................. B24B 1/00
[52] U.S. Cl. .............................. 51/281 R; 51/165.77; 51/165.91
[58] Field of Search ........... 51/165 R, 165.77, 165.93, 51/165.91, 281 R

[56] References Cited

U.S. PATENT DOCUMENTS

| 3,597,888 | 8/1971 | Kusakabe | 51/165.71 |
| 3,699,720 | 10/1972 | Lenning | 51/165.77 |
| 3,777,441 | 12/1973 | Kurimoto | 51/165.77 |
| 3,785,091 | 1/1974 | Pozzetti | 51/165 R |
| 3,863,400 | 2/1975 | Rossi | 51/165.91 |
| 3,964,210 | 6/1976 | Moritomo | 51/165.77 |

Primary Examiner—Harold D. Whitehead
Attorney, Agent, or Firm—Robert E. Burns; Emmanuel J. Lobato; Bruce L. Adams

[57] ABSTRACT

During rough grinding operation of a grinding machine, metal removal rate of the workpiece is detected for shifting the changing point from the rough grinding to fine grinding, and, with larger metal removal rate, the changing point is shifted earlier and vice versa with smaller rate to thereby keep approximately constant fine grinding stock removal to ensure minimum cycle time necessary for grinding work even if the grinding ability of the grinding machine is changed.

5 Claims, 4 Drawing Figures

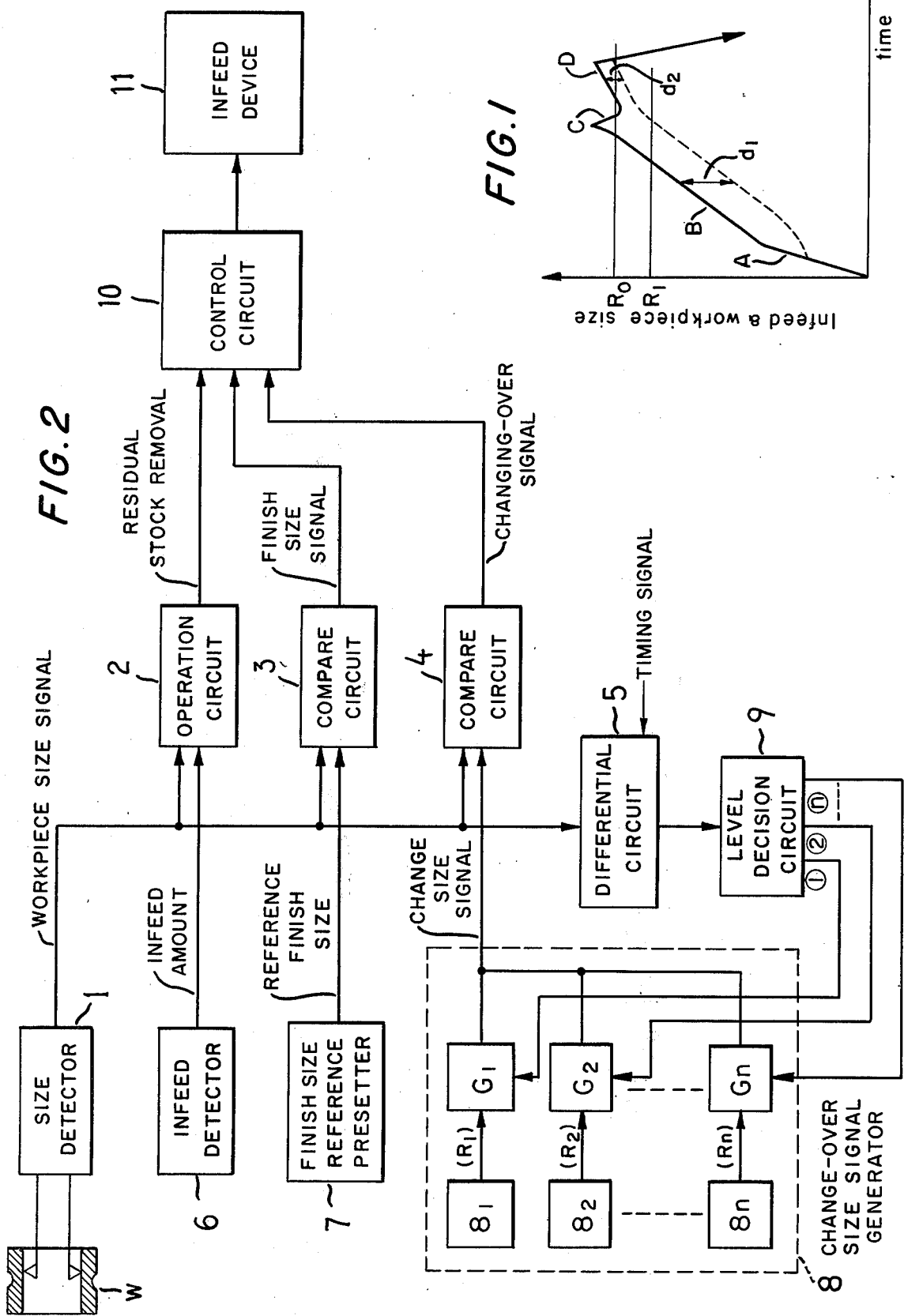

CONTROLLING METHOD FOR A GRINDING MACHINE

BACKGROUND OF THE INVENTION

This invention relates to a method of controlling a grinding process for a cylindrical or internal grinder, in which the changing point from the rough grinding to the fine grinding is automatically shifted, particularly, to a controlling method to adjust or shift the changing point (change-over size point) during response to the metal removal rate of the workpiece in the rough grinding.

In the grinding method having a rough grinding step and a fine grinding step, there is, for example, residual stock removal controlling method as follows.

In the residual stock removal controlling method, both the infeeding amount of the infeed table and an actual workpiece size are measured during working, successively detecting the residual stock removal or difference between the infeeding amount and the size to control the infeed speed keeping the residual stock removal constant. An example of a working cycle of this method is shown in FIG. 1, in which the solid line shows the infeeding amount and the dotted line shows the workpiece size. At first, the infeed table is fed rapid till the grinding wheel is positioned to work on the workpiece. At this beginning state, residual stock removal begins to occur and increases till a first predetermined residual stock removal $d_1$ for rough grinding, the rapid feeding finishing there (stop A). After reaching at the predetermined value $d_1$, the infeed table speed is controlled so that residual stock removal is kept at $d_1$, with working on the workpiece proceeding (rough grinding step B). When the workpiece size reaches at a predetermined changing point $R_1$ from rough grinding to fine grinding, the infeed table speed control is changed to keep a second predetermined residual stock removal $d_2$ ($<d_1$) by a change-over signal. At this change-over point, the infeed table is kept over-fed due to large residual stock removal of rough grinding so that it must be quickly retracted till residual stock removal decreases to be equal to a second predetermined value $d_2$ (step C) and after that the infeed table is fed so as to maintain residual stock removal value $d_2$ (step D). Workpiece size reaching at the finish size $R_0$, the infeed table is returned quickly to its original location and one grinding cycle is accomplished.

In this residual stock removal control method, the change from rough grinding step B, during which a first residual stock removal $d_1$ is kept, to fine grinding D, during which a second residual stock removal $d_2$ is kept, is carried out when workpiece size reaches at a predetermined value $R_1$. And there is naturally some time lag or response time (e.g. 0.1 sec.) from the electric changing signal generation till the moment when the residual stock removal decreases till the second residual stock removal $d_2$.

During this time lag, grinding of the workpiece is, off course, continued and the workpiece size is changing. The grinding amount in this transient time is larger when the grinding ability is good and vice versa when it is poor. Accordingly, good grinding ability decreases the stock removal for fine grinding so that the finish size is attained in a shorter time, and poor grinding ability increases the stock removal for fine grinding so that it requires a longer time to attain the finish size. That is, the deviation of the grinding amount in the aforementioned transient time causes deviations of working accuracy (particularly cylindricity, surface roughness etc.) and the cycle time (working time).

In other grinding methods in which rough grinding infeed speed is changed at a proper changing point to fine grinding infeed speed, there also occurs the aforementioned disadvantage.

SUMMARY OF THE INVENTION

Therefore, it is a principal object of the present invention to provide a controlling method for controlling a grinding machine with which a fine grinding condition is kept approximately constant for all states of grinding ability of the grinding wheel so that the cylindricity and surface roughness of the workpieces are made uniform and further that the cycle time for grinding a workpiece is not prolonged exceedingly.

In this method, metal removal rate (this changes in response to the grinding ability of the wheel) is measured in a proper time, and the changing point from rough grinding to fine grinding is shifted earlier or later in response to the metal removal rate.

BRIEF DESCRIPTION OF THE DRAWINGS

FIG. 1 is a timing graph representing a grinding cycle of residual stock removal infeed control, and FIG. 2 is a block diagram showing an embodiment of the present invention.

DETAILED DESCRIPTION OF THE PREFERRED EMBODIMENT

Figure 3:
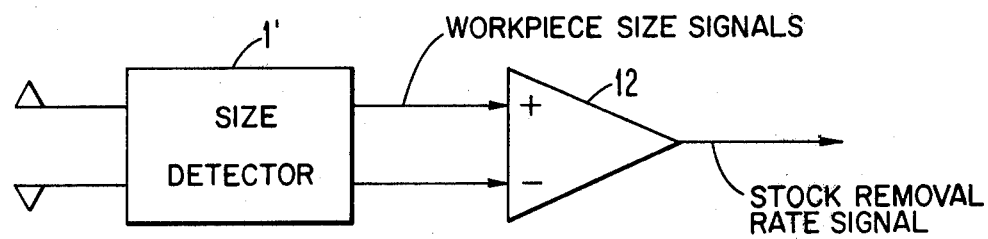
FIG. 3 is a block diagram of a further embodiment of the invention.

Now, some embodiments of the invention will be described hereinafter.

First, referring to the drawing, an embodiment applied to a residual stock-removal control internal grinder will be described. In FIG. 2, numeral 1 designates a size detector to measure the size of the workpiece W during a grinding process. The output (work size) of size detector 1 is fed to an operation circuit 2, first and second comparison circuits 3 and 4 and a differential circuit 5. Operation circuit 2 generates an output representative of residual stock removal as the difference between the infeed amount fed from an infeed position detector 6 of the infeed table and said work size. In first comparison circuit 3, said work size is compared with a reference finish size value $R_0$ and a size-up or finish signal is generated when the work size reaches the finish size $R_0$. In second comparison circuit 4, said work size is compared with a change-over size fed from a changing-over size signal generator 8 and a changing-over signal is generated when the work size reaches the change-over size.

Further, differential circuit 5 generates a stock removal or metal removal rate signal (metal removal rate hereafter) by receiving said work size during a proper time or reference interval during the rough grinding step, with the aid of a timing signal and applies the rate to a level decision circuit 9. Level decision circuit 9 compares the metal removal rate with a plurality of preset reference rates and generates an output at an output terminal ①,②,... or ⓝ in response to the level of the detected metal removal rate.

Said change-over size signal generator 8 comprises reference presetters $8_1$ to $8_n$, which respectively set up reference change-over size $R_1$ to $R_n (R_1 > R_2 > R_3 \ldots)$, and gates $G_1$ to $G_n$ respectively connected to the corresponding reference presetters $8_1$ to $8_n$. Gates $G_1$ to $G_n$ are correspondingly connected with the output terminals ① to ⓝ of level decision circuits 9 at their control terminals so that gates $G_1$ to $G_n$ are opened or closed by output signals from terminals ① to ⓝ. Thus, the smaller is the metal removal rate of the workpiece fed to level decision circuit 9, the larger becomes the change-over size signal fed to second comparing circuit 4.

Numeral 10 designates a control circuit to control an infeeding device 11 of the infeed table. This control circuit 10 controls, as mentioned above, infeeding device 11 to rapidly infeed the table till first preset point $d_1$, to infeed the same while maintaining first residual stock removal valve $d_1$ during the rough grinding step, to retract the table, in response to the change-over signal until second residual stock removal $d_2$ is attained, to again infeed the same while maintaining second residual stock removal $d_2$ during the fine grinding step, and to quickly return the table, in response to the size-up signal, till the initial position of the infeed table.

During the rough grinding step, a proper timing or reference interval is selected for feeding metal removal rate of the workpiece from differential circuit 5 to level decision circuit 9, and, with this rate signal, the change-over size signal is selected as described above. Either infeed table position, workpiece size or grinding time may be available for determining this rate, because, in the midst of rough grinding, the metal removal rate does not fluctuate so much.

For a grinding wheel in a certain condition of working on workpieces, metal removal rate X is to be preselected for the rough grinding step and change-over size $R_3$ is to be preselected, so that a desirable grinding cycle time is obtained. In this case, setting metal removal amount in the changing time (response time) from rough grinding to fine grinding, to Y, stock removal for fine grinding step is equal to $R_0 - (R_3 + Y)$.

If grinding ability of the wheel becomes deteriorated, metal removal rate in rough grinding decreasing e.g. to $X - \Delta X_1$, and the change-over size signal $R_3$ to second comparing circuit 4 is changed e.g. to, $R_2$. With this poorer grinding ability, metal removal during the changing time from rough to fine grinding also decreases to e.g. $Y - \Delta Y_1$, and accordingly stock removal for fine grinding becomes equal to $R_0 - (R_2 + Y - \Delta Y_1)$. Therefore, setting $R_2 \approx R_3 + \Delta Y_1$, stock removal for fine grindng is always kept approximately constant, with accompanying desirable grinding accuracy and avoiding prolongation of the cycle time.

When grinding ability is improved due to dressing or other causes and metal removal rate in rough grinding step becomes greater as $(X + \Delta \chi_2)$, the change-over size signal to second comparing circuit decreases to $(R_4)$. In this state, metal removal in the changing time from rough to fine grinding increases to $(Y + \Delta Y_2)$ and stock removal for fine grinding becomes equal to $R_o - (R_4 + Y + \Delta Y_2)$. If setting $R_4 \approx R_3 - \Delta Y_2$, the stock removal for fine grinding is also kept approximately constant and desired fine grinding time and grinding accuracy is attained.

As above described, advantageously correcting metal removal rates in the rough grinding step with the change-over sizes, changing point to fine grinding step is automatically shifted so that the stock removal for fine grinding step is kept approximately constant thereby maintaining desirable fine grinding condition and therefore good grinding accuracy. In the aforementioned embodiment, the change-over size signal generator may be constructed with an analogue circuit or other various constructions.

Further, this invention is also applicable to a grinding method which has constant residual stock removal infeed control for rough grinding step and has constant metal removal rate infeed control for fine grinding, by selecting a changing point from rough grinding to fine grinding in response to metal removal rate on the workpiece in the rough grinding step. It is obvious that the invention is further available to various grinding methods, such as a constant grinding force control method, which have fine grinding after a rough grinding step.

Metal removal rate may be obtained with the difference of workpiece sizes between two time points in the rough grinding step, set by a timer, or between two locations of the infeed table during a constant-feed rough grinding step, instead of differential operation of the differential circuit. And the change-over sizes may be set continuous using desirable function circuit, by which detected metal removal rate is converted into a corresponding change-over size signal, as well as step by step set of the above embodiment.

FIG. 3 illustrates a scheme for determining stock removal rate by measuring workpiece size at two different times, and determining the stock removal rate by determining the difference between the two meaured workpiece sizes. A size detector 1' measures workpiece size at different times in response to a timing signal applied thereto. A first output signal of the size detector 1' which is representative of the workpiece size at a first time is applied to the differential amplifier 12. Similarly, a second size detector 1' output signal representative of workpiece size at a second time is also applied to the differential amplifier 12. The output of the differential amplifier is representative of the stock removal rate during the interval between the two times at which the workpiece size was measured.

Figure 4:
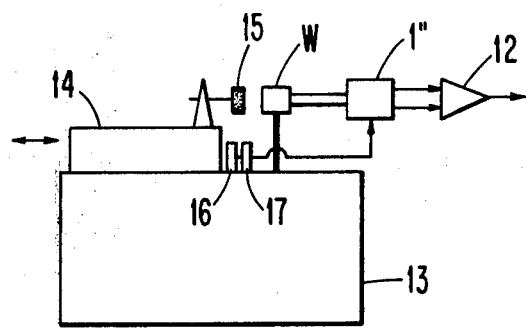
FIG. 4 discloses a grinder using the embodiment of FIG. 3.

FIG. 4 illustrates a grinding machine having a base 13 and an infeed table 14 moveable thereon. The infeed table 14 carries a grinder 15 and the table can move to change relative position between the grinder 15 and a workpiece W. The size of the workpiece is measured by a size detector 1''. A pair of position detectors 16, 17 are responsive to the position of the table 14 when the table is at two different positions. Each of the position detectors 16, 17 is effective to enable to size detector 1'', when they respectively respond to the position of the table 14. The outputs of the size detector 1'' are applied to a differential amplifier 12, and the amplifier 12 in turn develops an output signal representative of the stock removal rate during an interval between the respective responses of the position detectors 16, 17.

What is claimed is:

1. A method of controlling a grinding machine during grinding of a workpiece, comprising:
  rough grinding the workpiece; measuring a rate of stock removal during a reference interval during the rough grinding of the workpiece; comparing the value of stock removal rate measured during the rough grinding with a predetermined reference value of stock removal rate corresponding to a particular value of workpiece dimension; measuring the value of the workpiece dimension during the rough grinding; and changing from rough grinding to fine grinding of the workpiece when the measured value of the workpiece dimension is equal to the reference value of the workpiece dimension corresponding to the measured value of stock removal rate.

2. A method according to claim 1, wherein the step of measuring a rate of stock removal comprises: applying the measured values of the workpiece dimension measured during the rough grinding to a differential circuit during a reference interval for developing a signal representative of the rate of stock removal during the reference interval.

3. A method according to claim 1, wherein the step of measuring a rate of stock removal comprises: measuring the value of the workpiece dimension at two different times, and determining the value of a difference between the values of the workpiece dimension measured at the two different times.

4. A method according to claim 1, wherein said grinding machine includes a grinder and an infeed table positionable for changing a relative position between the grinder and the workpiece during grinding, and wherein the step of measuring a rate of stock removal comprises: measuring the values of the workpiece dimension when the infeed table is at two different predetermined positions during grinding; and determining a difference between the two measured values of workpiece dimension.

5. A method according to claim 1, wherein the particular value of workpiece dimension is selected so that an amount of stock removal during fine grinding in successive grinding operations is approximately constant.

* * * * *